M. SWEENEY.
Lamp Chimney.
No. 3,149. Reissued Oct. 6, 1868.
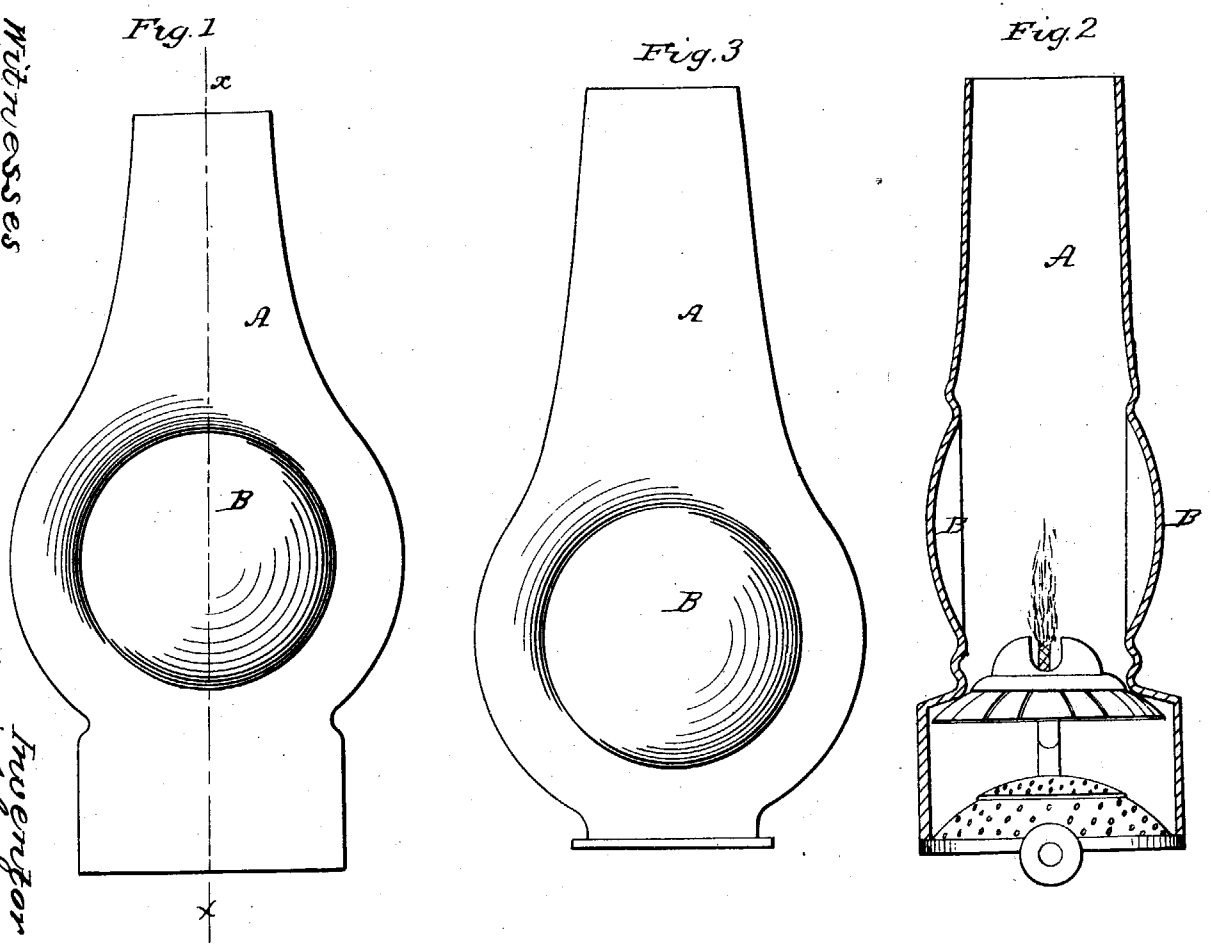
Witnesses
H. C. Ashlettter
Wm. A. Morgan
Inventor
Mich. C. Sweeney.
per Munn & Co
attorneys
N. PETERS, Photo-Lithographer, Washington, D. C.

United States Patent Office.

MICHAEL SWEENEY, OF WHEELING, WEST VIRGINIA, ASSIGNOR TO SWEENEY, BELL, AND COMPANY.

*Letters Patent No.* 79,277, *dated June* 23, 1868; *reissue No.* 3,149, *dated October* 6, 1868.

IMPROVEMENT IN LAMP-CHIMNEYS.

The Schedule referred to in these Letters Patent and making part of the same.

TO ALL WHOM IT MAY CONCERN:

Be it known that I, MICHAEL SWEENEY, of Wheeling, in the county of Ohio, and State of West Virginia, have invented a new and improved Lamp-Chimney; and I do hereby declare that the following is a full, clear, and exact description thereof, which will enable others skilled in the art to make and use the same, reference being had to the accompanying drawings, forming a part of this specification.

This invention relates to lamp-chimneys, and consists in constructing a lamp-chimney with a lens, concavo-convex in form, the convexity and concavity being such as to leave the walls of the chimney of uniform thickness, or as nearly so as the construction will admit of, there being one or more such lenses in each chimney, and in such parts thereof that the rays of light from the flame will be concentrated thereby, and thrown upon any desired object, when placed in position to receive them.

In the accompanying sheet of drawings—

Figures 1 and 2 are side views of a chimney constructed according to my invention.

Figure 3 is a vertical central section of the same, taken in the line *x x* of fig. 1.

Similar letters of reference indicate corresponding parts.

A represents a glass lamp-chimney, constructed with two concavo-convex lenses, B, at opposite sides thereof. These lenses are of a size corresponding to the dimensions of the lower part of the chimney, and they are at such a point in the latter that their centres will be about in line with the centre of the flame of the burner, as shown in fig. 3, which figure also shows a section of said chimney, the green lines showing the form, and, comparatively, the thickness of the walls of said chimney, while the dark lines are only intended to show the shading.

These lenses concentrate the rays of light, and, by a proper adjustment of the lamp, will project them upon the book, work, or other object to be looked upon, rendering it more discernible or clearer than it otherwise would be, and at the same time sufficient light will be cast in other directions to render a room cheerful, the gloom caused by a shade over a chimney, which is now very generally used, being avoided.

I am aware that a patent has been granted for "a lamp-chimney with the bulge so thickened as to form an annular lens for refracting rays of light," and also a "chimney having on its bulb a series of rings or circles to diffuse light," neither of which I claim as my invention.

Having described my invention, I claim as new, and desire to secure by Letters Patent—

As an article of manufacture, a lamp-chimney, constructed with the lens or lenses B, one or more, in its surface, substantially as shown and described.

In testimony whereof, I have signed my name to this specification before two subscribing witnesses.

MICHAEL SWEENEY.

Witnesses:

GEORGE O. DAVENPORT,

JOHN G. CHANDLER.